(Model.)
J. HAMILTON.
SEED DRILL.
No. 264,876. Patented Sept. 26, 1882.
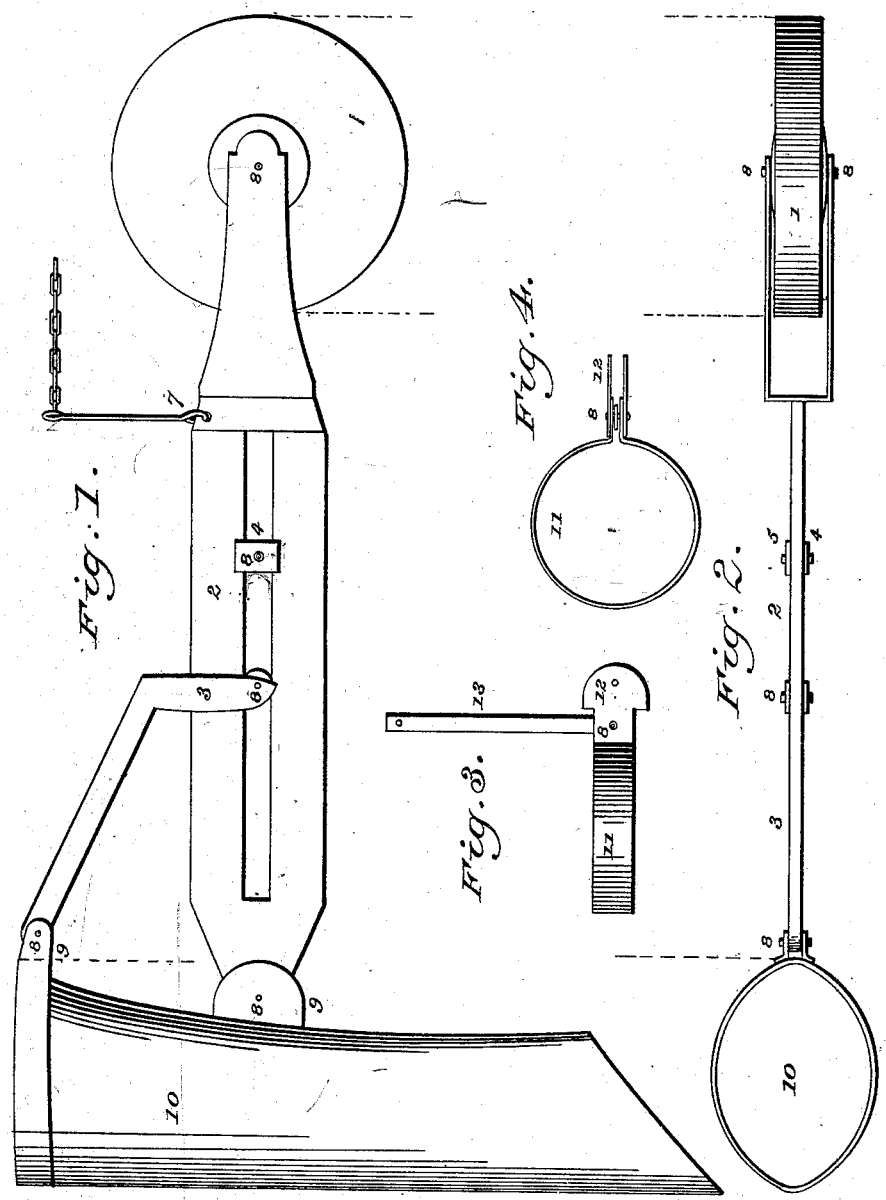

UNITED STATES PATENT OFFICE.

JOHN HAMILTON, OF STATE COLLEGE, PENNSYLVANIA.

SEED-DRILL.

SPECIFICATION forming part of Letters Patent No. 264,876, dated September 26, 1882.

Application filed May 9, 1882. (Model.)

*To all whom it may concern:*

Be it known that I, JOHN HAMILTON, a citizen of the United States, residing at State College, in the county of Centre and State of Pennsylvania, have invented a new and useful Improvement in Seed and Grain Drills, of which the following is a specification.

My invention relates to improvements in seed or grain drills which deposit seed in the earth through tubes or teeth one end of which runs in the ground; and the object of my improvement is, first, to regulate the depth at which the seed is deposited in the ground; second, in combination with the above, to provide a means by which the soil shall be compressed over the newly-sown seed without leveling the ridges raised by the drill-teeth; third, to furnish a means of attaching the apparatus to drill-teeth not specially prepared for it; fourth, to provide a means of hoisting the apparatus off the ground. I attain these objects by the mechanism illustrated in the accompanying drawings, in which—

Figure A is a side elevation of my machine. Fig. D is a top view or plan of the same. Fig. B is a side elevation of the device for attaching the machine to any drill-tooth. Fig. C is a plan of the same.

Similar figures refer to similar parts throughout the several views.

The machine is preferably made of iron throughout, excepting the large wheel, which may be of either iron or wood.

1 is a wheel of about seven inches in diameter.

2 is an arm or bar connecting the wheel 1 with the drill-tooth at the lower pair of lugs.

3 is a bar, acting as a brace, running from arm 2 to the upper pair of lugs on the drill-tooth.

4 and 5 are plates to be bolted across the slot in arm 2.

6 is a small wheel running in the slot in arm 2, and attached by a bolt to the end of brace 3.

7 is a small rod and chain attached to the rear of arm 2, just in front of the wheel 1.

8 are bolts for connecting the various parts of the machine.

9 are lugs cast on the rear side of the drill-tooth.

10 is a drill-tooth graduated at the side.

11 is a band for clasping the drill-tooth.

12 are lugs to be attached to band 11.

13 is a brace to hold the band 11 and the lugs 12 in place.

The wheel 1 has a narrow face, and follows in the small furrow made by the drill-tooth, compressing the earth, and at the same time acting as a carrier of the tooth and its attachments. When the wheel is made of wood two iron plates are screwed one on each side to prevent splitting of the wood, and to receive the wear of the bolt that connects the wheel with arm 2. The hole through the center of the wheel is round.

The piece or arm 2 connects the wheel 1 with the drill-tooth 10 at its lower lugs, 9. This bar is divided at one end into two branches, between which branches the wheel 1 is secured by a bolt. The remainder of the bar, for part of its length, is perforated by a slit running lengthwise. There is a small hole in the upper side of the bar, and just in front of the wheel 1, to receive the small rod and chain 7. This bar has also a hole at each end for the purpose of connecting it at one end with the lower lugs on the drill-tooth and at the other end with the wheel 1. The bar is also indented along the slot on both sides with small notches to hold firmly the plates 4 and 5 and prevent their sliding.

The brace 3 is curved at one end, and has two lugs or branches that fit down over arm 2 and run across the slot. At the point where these lugs cross the slot there is a hole through them, through which passes a bolt, fastening in place a small wheel, 6. The other end is perforated by a round hole, through which a bolt passes, connecting the bar with the upper pair of lugs, 9, on the drill-tooth 10.

The plates 4 and 5 have indentations fitting closely the notches on the sides of the bar 2. These plates are held in place by a bolt passing through them and clamping them to the bar. Part of the inner surface of the plates is made to fit in the slot in arm 2, and extends about one-third across it.

The wheel 6 is so placed as to project beyond the rear face of the arms or lugs on brace 3, so as to strike the plates 4 and 5 when the brace 3 is forced back.

The rod and chain 7 is for hoisting the apparatus and drill-tooth in turning, or when clogged with rubbish, stones, &c., and also for throwing the seeding apparatus out of gear. The rod is for the purpose of preventing the slack of the chain from becoming entangled in the wheel 1, and is attached to the small hole in arm 2, just in front of the wheel 1.

The drill-tooth is graduated on the side into inches to indicate the depth at which the tooth may be running in the soil.

The band of strap-iron, 11, clasping the drill-tooth, is for the purpose of holding the lugs 12 in place. There is a hole at each end of this band, through which a bolt passes, clamping the lugs 12 to the band.

The brace and support 13 has a hole at each end, by which it is fastened at one end to the band 11 and at the other end to the lug at the top of the drill-tooth, where the arm 3 is also fastened.

I am aware that wheels and braces attached to the rear of drill-teeth have been used for preventing them from running too deep in the ground; but they are of such a form and are constructed in such a way as to lift the wheel off the ground when the tooth springs back or jumps over an obstruction. The effect consequently is to prevent the free and independent working of the tooth, and also to endanger the machine through frequent, sudden, and unusual strain. It also causes the tooth to sink deep into the soil when it is sprung back, by bringing the weight of the wheel and its attachments to bear upon it, thus, to a great extent, defeating the object of the invention. My invention overcomes these difficulties through the use of the slot in the main bar, in combination with the brace and clamps and their peculiar arrangement.

I am also aware that a band has been used for the purpose of attaching a wheel and its apparatus to the drill-tooth; but in all cases of which I have knowledge the band is at or near the top of the drill-tooth, and is kept in position by being bolted or riveted to the lugs on the front part of the tooth, and is not constructed so as to be capable of attachment at various points along the tooth below the lugs, except the teeth be specially prepared for it.

What I claim, and desire to secure by Letters Patent, is—

1. In a seed-drill, the combination of the drill-tooth, the wheel 1, the bar 2, pivoted to the tooth and having the long slot, and the pivoted bar 3, substantially as described.

2. The combination, with the drill-tooth, the slotted bar, the wheel, and pivoted brace, of the band 11 and lugs, substantially as described.

3. The combination, with the slotted pivoted bar 2, clamping-plates 4 and 5, and brace 3, of the lifting-chain attached to said bar, substantially as described.

4. The combination, with the drill-tooth wheel, slotted bar, brace, and band 11, of the brace or support 13, substantially as described.

JOHN HAMILTON.

Witnesses:
JAMES Y. MCKEE,
WILLIAM CALVIN PATTERSON.